I. S. RECTOR.
POULTRY FEEDER.
APPLICATION FILED MAY 25, 1912.

1,148,405.

Patented July 27, 1915.
2 SHEETS—SHEET 1.

Witnesses
William Smith.
P. M. Smith.

Inventor
Isabella S. Rector.
By Victor J. Evans
Attorney

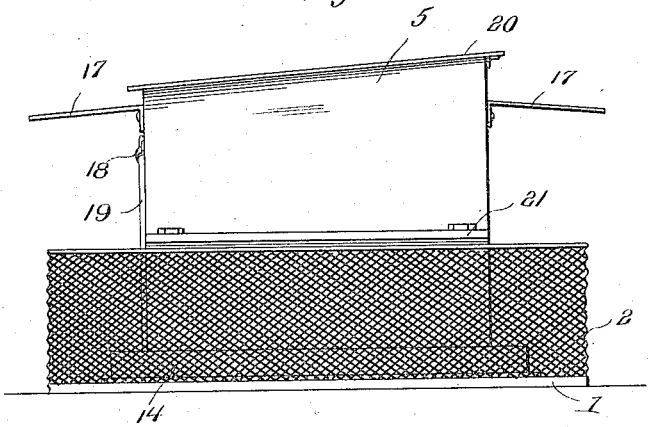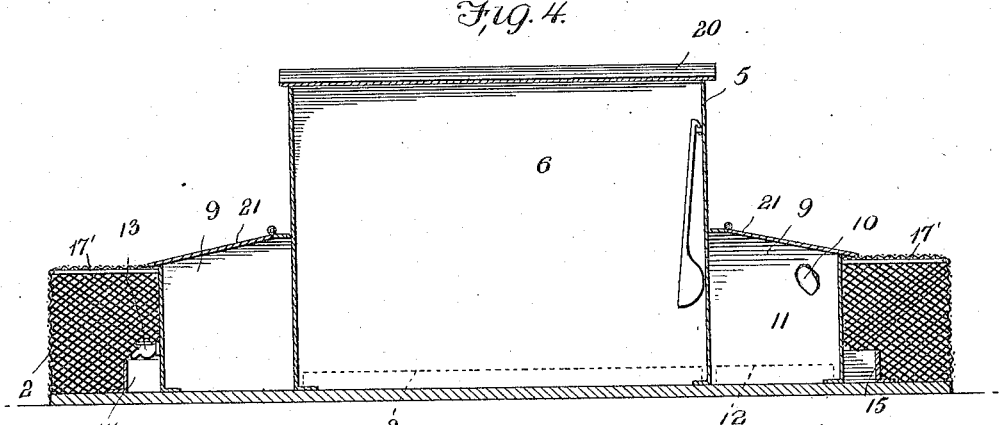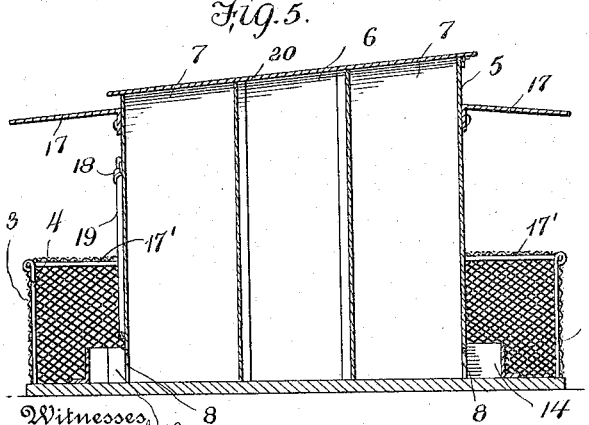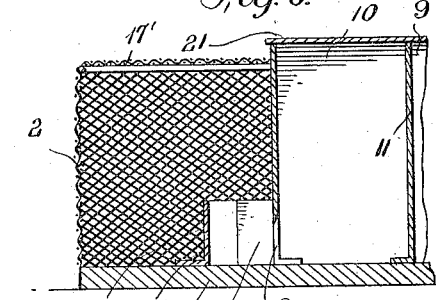

UNITED STATES PATENT OFFICE.

ISABELLA SCOTT RECTOR, OF WILLIAMSPORT, OHIO.

POULTRY-FEEDER.

1,148,405.   Specification of Letters Patent.   Patented July 27, 1915.

Application filed May 25, 1912. Serial No. 699,757.

*To all whom it may concern:*

Be it known that I, ISABELLA SCOTT RECTOR, a citizen of the United States, residing at Williamsport, in the county of Pickaway and State of Ohio, have invented new and useful Improvements in Poultry-Feeders, of which the following is a specification.

This invention relates to poultry feeders, the object of the invention being to provide a convenient and practically indestructible feeder for distributing feed, water, and grit to the fowls, the feeder as a whole being adapted to be made in any size for fowls of different ages, and serving also as a protection for young fowls.

The device as a whole will be found very convenient in raising young chickens, affording as it does ample protection against rats, and the like, and older fowls, and also serving as ample protection for the young fowls in rainy or stormy weather.

With the above and other objects in view, the invention consists in the construction, combination and arrangement of parts, as will be hereinafter more fully described, illustrated in the accompanying drawings, and pointed out in the claim hereunto appended.

Figure 1:
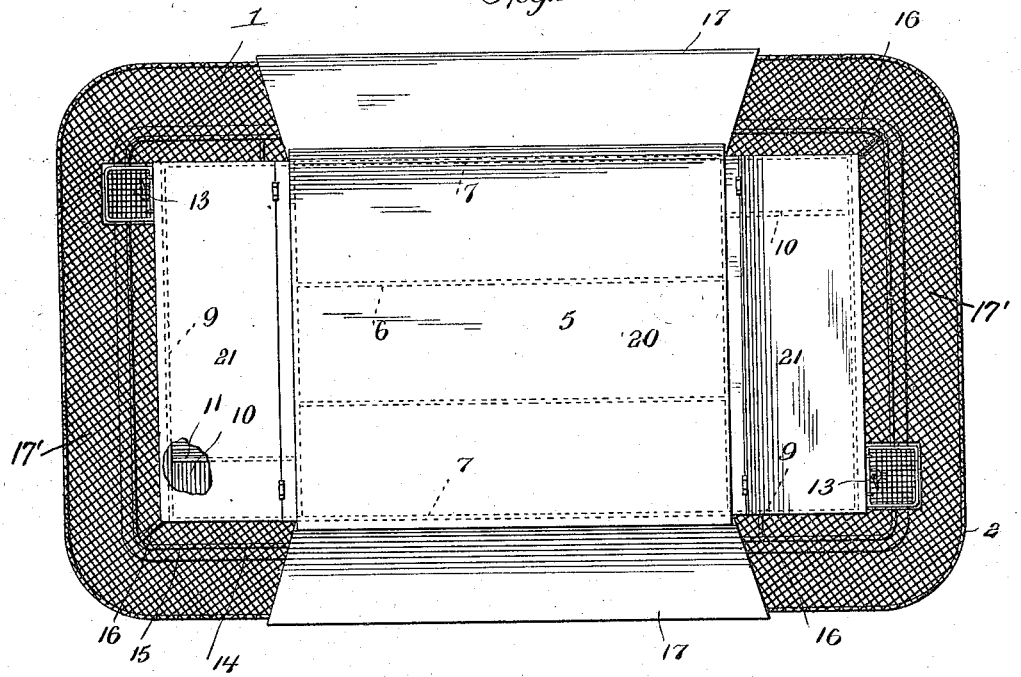
Figure 2:
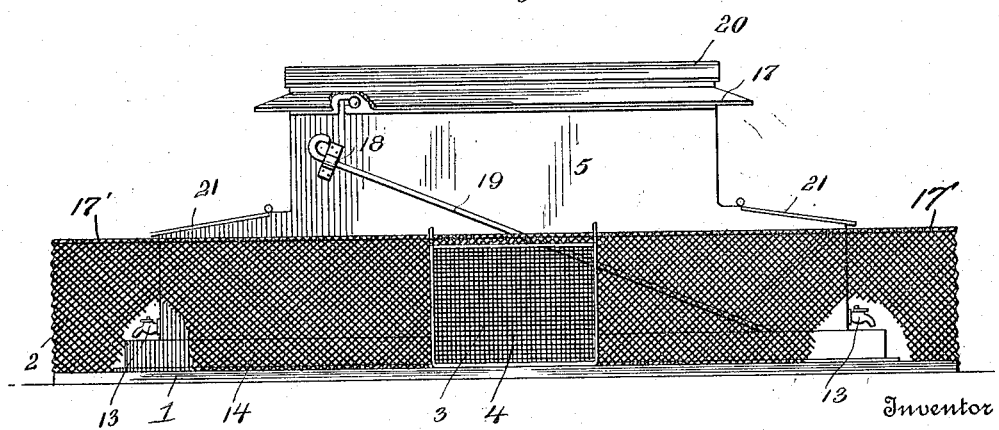

In the drawings: Figure 1 is a plan view of the feeder. Fig. 2 is a side elevation thereof. Fig. 3 is an end view of the same. Fig. 4 is a vertical longitudinal section through the feeder. Fig. 5 is a central vertical cross section through the same. Fig. 6 is a vertical cross section through one of the grit receptacles.

The poultry feeder contemplated in this invention comprises essentially an imperforate base 1, the size of which corresponds of course with the capacity of the feeder, as a whole.

Extending entirely around the base 1 is a fence 2 which is shown as made up of meshed wire fabric, although galvanized sheet iron may be employed as a substitute therefor. This fence is provided in one or more places with gate-ways 3 adapted to be closed by sliding gates 4, in order to confine the fowls therein.

Arranged centrally of the base and extending upward therefrom is a compartmental feed magazine 5, comprising a central main crib 6, in which the feed is adapted to be contained, and compartments 7 at opposite sides of the main central compartment, into which the feed is adapted to be placed upon its removal from the central compartment. Each of the side or magazine compartments is provided at the bottom and at the outer side thereof with a discharge opening 8, through which the feed is adapted to gravitate into a trough, hereinafter particularly described.

At opposite ends of the feed bin, there are arranged combined water reservoirs and grit bins 9 and 10, respectively. Each of these end bins consists of a box-like receptacle, within which is arranged a partition 11 which divides such receptacle into two compartments, the larger compartment being adapted to contain water, and the smaller compartment being adapted to contain grit, and being provided in the bottom thereof with a discharge opening 12, through which the grit is let out into the trough, hereinafter described. The water compartment is provided with a faucet 13 which may be opened and closed, as necessary, in order to allow the desired amount of water to escape into the trough.

Extending entirely around the magazine including the feed bin and the water and grit receptacles is a trough 14, consisting of an endless flange 15 extending upward from the base and secured to the latter, the inner wall of the trough being formed by the outer walls of the feed bin and the end receptacles which contain the water and grit compartments. This trough is sub-divided by vertical partitions 16, into feed, water and grit sections or compartments, the same being respectively adapted to receive the feed from the discharge openings in the feed bin, the grit from the grit compartments, and the water from the water reservoirs, so that all of such materials are kept separate from each other, and capable of being independently supplied from the source of supply, hereinabove described.

17 designates water sheds extending over the walk-way or passage formed between the fence and the magazine, and 17' designates a cover or protective top which extends around and above the walk-way and is composed of meshed wire fabric. Such meshed wire cover will prevent the intrusion of larger fowls and thus protect the smaller fowls contained inside of the fence. The water sheds 17 serve as a protection for the smaller fowls in rainy weather.

On the outside of the central feed bin, there is provided a keeper 18, in which is removably inserted a tamper 19 which may be readily removed from the keeper 18, when desired, said tamper being used for forcing the feed through the discharge openings in the magazine compartments at opposite sides of the main central feed compartment above described.

The feed bin as a whole is provided with an imperforate cover 20 adapted to shed the rain, said cover being arranged to be lifted, so that access may be had to the compartments of the feed bin, and the end receptacles are also provided with the slanting covers 21 for the same purpose, the same being hinged, so that they may be thrown upward to give access to the end compartments containing the water reservoirs and the grit bins or magazines.

The device as a whole hereinabove described will be found of great convenience in looking after fowls of any age, as all of the necessary equipment is combined in one device.

What is claimed is:

A portable poultry feeder comprising an imperforate horizontal base, a vertical fence extending entirely around the margin of the base and attached along its bottom edge to said base, a compartmental magazine arranged centrally of the base and at a distance from the fence leaving an endless open air walk-way around the magazine, said base forming the floor of the walk-way, an endless compartmental trough extending entirely around the magazine, an endless meshed wire cover extending over said walkway and around the outside of said magazine, and a water shed projecting from the magazine over said walk way above said meshed wire cover.

In testimony whereof I affix my signature in presence of two witnesses.

ISABELLA SCOTT RECTOR.

Witnesses:
 KATE PICKEL,
 MAY HILL.

Copies of this patent may be obtained for five cents each, by addressing the "Commissioner of Patents, Washington, D. C."